UNITED STATES PATENT OFFICE.

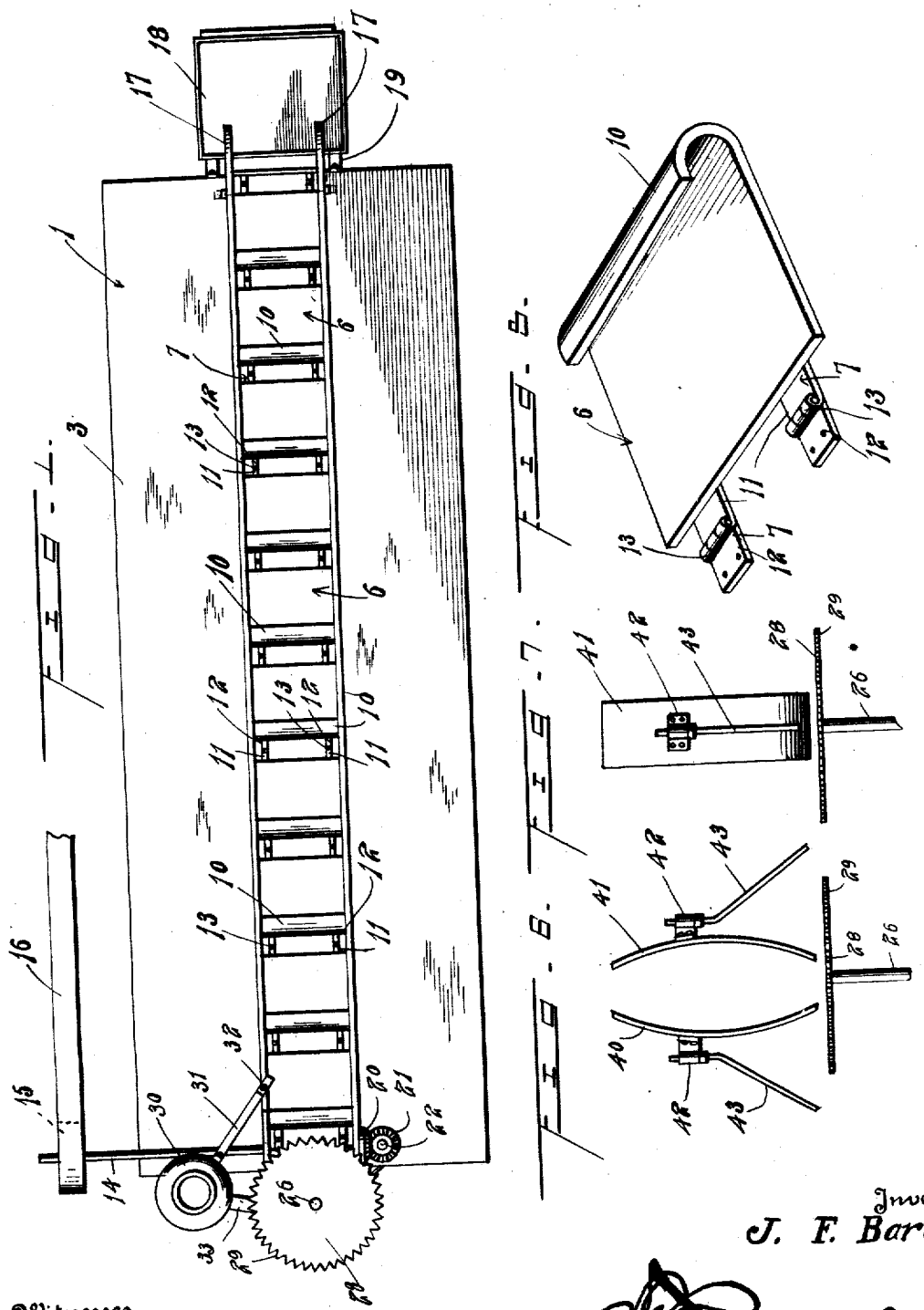

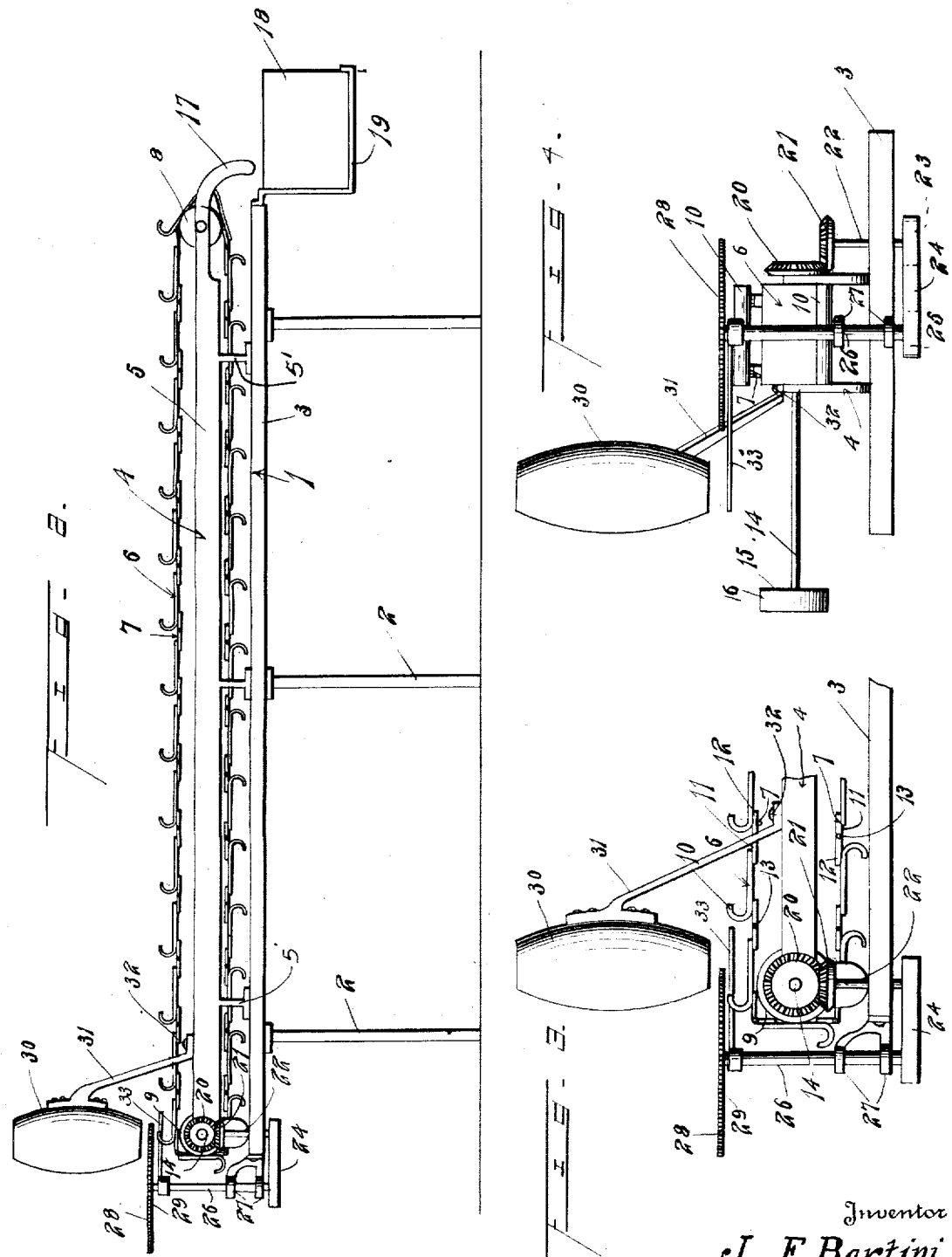

JOSEPH F. BARTINI, OF WASHINGTON, DISTRICT OF COLUMBIA.

BREAD CUTTER AND CARRIER.

1,345,118.  Specification of Letters Patent.  Patented June 29, 1920.

Application filed September 4, 1919. Serial No. 321,564.

*To all whom it may concern:*

Be it known that I, JOSEPH F. BARTINI, a citizen of the United States, residing at Washington, in the District of Columbia, have invented certain new and useful Improvements in Bread Cutters and Carriers; and I do hereby declare the following to be a full, clear, and exact description of the invention, such as will enable others skilled in the art to which it appertains to make and use the same.

This invention relates to a bread cutter and carrier which is adapted for use in various types of institutions, such as homes for soldiers, aged people or the like, and the primary object of the invention is to provide a device which will materially facilitate the cutting and passing of bread to the persons seated at a table.

Another object of this invention is to provide an endless conveyer which is mounted upon the table intermediate the edges of the same and for travel longitudinally over the top of the table for carrying slices of bread thereover so that the persons seated at the table may readily reach the bread and remove it from the conveyer when desired and further to provide a pan or box for receiving any slices of bread which might have passed the entire length of the table without being removed from the conveyer.

A further object of this invention is to provide a rotary knife and a bread retaining cylinder, through which the bread is fed by gravity, so that it will be sliced by the knife.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the invention showing it applied to a table,

Fig. 2 is a side elevation of the table showing the application of the improved bread cutter and carrier, Fig. 3 is an enlarged view showing the bread cutting structure and a portion of one end of the conveyer, Fig. 4 is an end view of the invention, Fig. 5 is a perspective view of one of the bread carrying plates of the conveyer structure, Fig. 6 is a side elevation of a modified form of the bread retaining cylinder, and Fig. 7 is an edge view of the structure illustrated in Fig. 6.

Referring more particularly to the drawings, 1 designates an ordinary table which is supported by the usual type of supporting legs 2. The table top 3 has a conveyer structure generically indicated by the numeral 4 placed thereon and extending longitudinally of the table in the center of the top as clearly shown in Fig. 1 of the drawings. The conveyer structure 4 includes supporting side rails 5 which are supported above the table by suitable supporting legs 5'. The conveyer proper which is composed of a plurality of bread carrying plates 6 and links 7 travels over rollers 8 and 9 which are carried by the side rails 5. The bread carrying plates 6 have their ends rolled as shown at 10 to provide an upstanding portion for engaging one edge of a slice of bread so that the bread will be carried along with the movement of the plates and prevented from slipping or accidentally passing off the plate. The links 7 are composed of hingedly connected sections 11 and 12 which are hinged together as shown at 13 so as to permit the conveyer to pass over the rollers 8 and 9 as clearly shown in the drawings.

The propelling roller 9 is mounted upon a shaft 14, which shaft extends beyond the edge of the table top 3 and has a pulley 15 mounted thereon about which a belt 16 passes. The belt 16 may be connected to any suitable type of prime mover or propelling means for rotating the shaft and consequently rotating the roller 9 for operating the conveyer 6.

The side rails 5 have their ends, positioned at the delivery end of the conveyer structure turned downwardly as shown at 17 for guiding slices of bread into a receiving box 18 which is supported by suitable brackets 19. The brackets 19 are attached to the table 1 in any suitable manner.

The shaft 14 has a beveled gear 20 mounted thereon which meshes with a second beveled gear 21 carried by a vertical shaft 22. The vertical shaft 22 extends through the table top 3 and has a pulley 23 mounted upon its lower end about which a belt 24 travels. The belt 24 also travels about a pulley 25 mounted upon a vertical shaft 26. The shaft 26 is supported by suitable bearings 27 which may be attached to the table top 3 in any suitable manner.

The shaft 26 has a circle knife 28 carried by its upper end, which knife is provided with peripheral teeth 29 which slices the bread.

The bread is retained and fed to the knife 28 by a cylinder 30, which cylinder is supported by an arm 31. The arm 31 is pivotally connected as shown at 32 to one of the side rails 5 of the conveyer structure. The cylinder 30 may be shaped to fit a loaf of bread. An arm 33 is carried by the shaft 26, and it may be adjustably mounted thereon. The edge of the bread beneath the lower open end of the cylinder rests upon the plate 33, and hence the adjustment of the plate regulates the thickness of the bread. The arm extends outwardly beneath the different positions of the cylinder 30 and prevents the bread from falling out of the cylinder upon the table.

In the operation of the improved bread cutter and conveyer, the lower end of the loaf of bread will extend out of the cylinder 30 and rest upon the plate 33, after which the cylinder is swung upon its pivot 32 so that the slides 28, during its rotation will engage and pass through the loaf of bread slicing a slice off the same, which slice of bread falls upon one of the plates 6 and is carried along over the table top 3 until it is taken from the conveyer by a person seated at the table. In case the bread is not taken from the conveyer, it will be deposited in the box 18 from whence it may be taken and used for any purpose, or replaced upon the receiving end of the conveyer.

In Figs. 6 and 7 of the drawings, a modified form of the bread holder is illustrated. The modified form comprises a pair of arcuated plates 40 and 41 which engage a loaf of bread on opposite sides of the same, and hold it in proper position for feeding to the knife 28. The plates 40 and 41 have brackets 42 attached thereto to which the supporting arms 43 of the members are rotatably attached.

From the foregoing description taken in connection with the accompanying drawings the advantages of construction and of the method of operation of the improved bread cutter and carrier will be readily apparent to those skilled in the art to which the invention appertains and, while in the foregoing description, the principle of the operation of this invention has been described together with various features of construction, it is to be understood that certain minor features of construction, combination, and arrangement of parts may be altered to suit practical conditions provided such alterations are comprehended within the scope of what is claimed.

What is claimed is:

1. In a slicing machine, a support, a vertically disposed shaft journaled on the support, shaft rotating means, a circular knife fixed to the shaft for rotation therewith, an upstanding arm pivoted to the support, a tubular member fixed to the upper end of the supporting arm and adapted to retain the object to be sliced, the arm being adapted to be swung to a position where the tubular member will be disposed above the circular knife at one edge thereof, and an outstanding arm carried by the shaft and disposed below the knife to engage the end of the object to support the same in position to be engaged by the knife.

2. In a slicing machine, a support, a vertically disposed shaft journaled on the support, shaft rotating means, a circular knife fixed to the shaft for rotation therewith, an upstanding arm pivoted to the support, a tubular member fixed to the upper end of the arm and adapted to retain the object to be sliced, the arm being adapted to be swung to a position where the tubular member will be disposed above the knife at one edge thereof, an outstanding arm carried by the shaft and disposed below the knife to engage the end of the object to support the same in position to be engaged by the knife, and a carrier adapted to convey the slices away from the knife.

In testimony whereof I affix my signature in presence of a witness.

JOSEPH F. BARTINI.

Witness:
BENNETT S. JONES.